(12) United States Patent
Hishinuma

(10) Patent No.: US 7,073,660 B1
(45) Date of Patent: Jul. 11, 2006

(54) BELT CURVE CONVEYOR

(75) Inventor: Nobuya Hishinuma, Yokohama (JP)

(73) Assignee: Sanki Engineering Co., Ltd., Tokyo (JP)

( * ) Notice: Subject to any disclaimer, the term of this patent is extended or adjusted under 35 U.S.C. 154(b) by 0 days.

(21) Appl. No.: 11/182,097

(22) Filed: Jul. 15, 2005

(30) Foreign Application Priority Data

Feb. 4, 2005 (JP) ............................... 2005-029664

(51) Int. Cl.
*B65G 15/02* (2006.01)
*B65G 21/16* (2006.01)
*B65G 39/16* (2006.01)

(52) U.S. Cl. ................. 198/831; 198/836.1; 198/836.3

(58) Field of Classification Search ............. 198/836.1, 198/836.3, 831
See application file for complete search history.

(56) References Cited

U.S. PATENT DOCUMENTS

| | | | | |
|---|---|---|---|---|
| 3,217,861 A | * | 11/1965 | Daniluk et al. | 198/816 |
| 3,237,754 A | * | 3/1966 | Kraft, Jr. et al. | 198/831 |
| 3,901,379 A | * | 8/1975 | Bruhm | 198/831 |
| 3,951,256 A | * | 4/1976 | Gurewitz | 198/831 |
| 4,930,621 A | * | 6/1990 | Brown et al. | 198/831 |
| 4,955,466 A | * | 9/1990 | Almes et al. | 198/831 |
| 5,332,082 A | * | 7/1994 | Sommerfield | 198/831 |
| 5,857,559 A | * | 1/1999 | Gianvito et al. | 198/831 |
| 5,911,306 A | * | 6/1999 | Ferrari | 198/836.1 |
| 6,105,755 A | * | 8/2000 | Muchalov | 198/831 |
| 6,484,871 B1 | * | 11/2002 | van Leeuwen | 198/831 |
| 6,843,366 B1 | * | 1/2005 | Shiotani | 198/831 |
| 6,889,823 B1 | * | 5/2005 | Delaporte et al. | 198/836.3 |
| 2004/0035685 A1 | | 2/2004 | Fujiwara et al. | |

FOREIGN PATENT DOCUMENTS

JP        2002-114343       4/2002

* cited by examiner

*Primary Examiner*—Douglas Hess
(74) *Attorney, Agent, or Firm*—Michael J. Striker

(57) ABSTRACT

A belt curve conveyor has a number of guide wheel units provided in proximity to the peripheral part of a fan-type belt slung over between tapered end pulleys of a drive side and a driven side, wherein the guide wheel units comprise first and fourth guide wheels are supported by a holder member secured to a base and second and third guide wheels supported by a bracket, a rotary lock part is provided at inner center of the holder member around an axis of rotation of the bracket while a keyhole is formed at an outer surface to be engaged with a key part arranged on a detachable lock handle so that the second guide wheel and the third guide wheel become separated from an inner surface of the belt by inserting the key part of the lock handle in the lock part, pressing and turning the lock to rotate the bracket in the same direction by 90 degrees, which enables the belt to be removed.

5 Claims, 6 Drawing Sheets

BELT CURVE CONVEYOR

BACKGROUND OF THE INVENTION

1. Field of the Invention

The present invention relates to a belt curve conveyor used for changing direction of transportation of objects, and more particularly, to a belt curve conveyor comprising a fan-type belt detachably mounted on a body thereof.

2. Prior Art

In general, a belt curve conveyor is utilized to change the transporting direction of a belt conveyor for carrying objects.

In a conventional belt curve conveyor, in order to prevent a belt from being caught or deviated inside due to its tension, a marginal section is formed on the periphery of a fan-type belt in which a number of guide roller independently mounted on a guide bridge provided on the periphery of the belt in such a manner that those guide rollers pinch the ledge so as to maintain the tension against the outside of the fan-type belt. As a result, such a belt can not be exchanged or replaced easily.

This type of belt conveyor is replaced when necessity arises. In particular, when food or pharmaceuticals are transported, a belt is removed and cleaned on a regular basis to keep the whole conveyor line clean. For this purpose, a conventional belt in which a set of two guide rollers mounted vertically on upper and lower lines to prevent the belt from being deviated by supporting a thick part (projection) of the belt end, which allows the belt to be replaced easily, is common.

One example is shown in Japanese patent unexamined publication No. 2002-114343 (page 4, left column, line 33 to page 5, right column, line 31, and FIGS. 1 and 4). A cam is mounted on the upper part of an operation lever in which the lever is rotated in such a manner that the upper cam comes into a contact with a frame face as its first cam face changes to its second cam face so that an arm securing a guide roller on each side thereof is energized by a spring to spread in a suitable manner, and is extruded from the guide member to protrude forward so as to spread the arm so that the guide rollers come out from the thickest part (projection) of the belt end, which enables the belt to be replaced.

Problems to be Solved by the Invention

However, in a conventional belt curve conveyor, each of the guide rollers is secured to a fixed holder by a bolt engaged onto an inner surface of the guide roller through a bearing. When a belt is attached or removed, the fixed holder must be partially removed so as to remove both the guide rollers and the engaging means. As a result, a tool is required to remove a part of the fixed holder and remove the guide rollers with their engaging means. In addition, as the holder, rollers, and bolts are dismantled, it necessitates some time and labor to reinstall a fan-shaped belt after it has been disassembled and cleaned.

Furthermore, as shown in the prior art disclosed in the aforementioned publication, the thickest part of the belt end can be released by an operation lever to release guide rollers, which allows the belt to be pulled out on the internal diameter side. However, the energizing force to the extending direction of the upper and lower arms is weakened by being stored in the guide members for a long time so that it does not extend well when being protruded forward by the operation lever; as a result the thickest part (projection) of the belt end is caught by the lower guide roller as the belt sags down when it is pulled out to the fan shape on the internal diameter side, which eventually necessitates disassembly and removal of the guide rollers. As a further result, a tool is required to disassemble and remove a part of the fixed holder so as to remove the guide rollers and their engaging bolt, and to assemble them again. In addition, as the holder, rollers, and bolts are dismantled, it requires a certain amount of time and labor to reinstall a fan-shaped belt after it has been disassembled and cleaned.

SUMMARY OF THE INVENTION

An object of the present invention is to provide a belt curve conveyor in which the guide wheels provided inside of a belt rotate 90 degrees sequentially by the operation of a lock handle, which allows the belt to be removed easily.

In order to achieve the above object, a belt curve conveyor defined in claim 1 comprises a number of guide wheel units provided in proximity to the peripheral part of a fan-type belt slung over between tapered end pulleys of a drive side and a driven side, wherein an approximately semicircular profile is formed on both front and rear surfaces of the peripheral part of the belt in such a manner to abut on the guide wheels, said guide wheel units comprises a first guide wheel and a fourth guide wheel abutting the outside face edge of a carrier belt and a return belt, and a second guide wheel and a third guide wheel abutting the inside face edge of a carrier belt and a return belt; said first guide wheel and fourth guide wheel are supported by upper and lower horizontal edges of a holder member secured to an outer peripheral part of a base while said second guide wheel and third guide wheel are supported by upper and lower edges of a rotation axis bracket rotatably secured to the inner center of the holder member wherein a spacer rubber or a rubber bush for biasing each wheel in the radial direction, that is, the lateral direction, is engaged into an inner race of a rolling bearing in each guide wheel in such a manner to penetrate a supporting bolt into the spacer rubber or the rubber bush to be fixed to the upper and lower edges of the holder member or the bracket; and a rotary lock part provided at the inner center of the holder member around the same axis of the rotation axis of the bracket while a keyhole formed at the outer surface thereof so as to be engaged with a key part arranged at the end of a detachable lock handle so that the second guide wheel and the third guide wheel become separated from the inner surface of the belt by means of inserting the key part of the lock handle in the lock part, pressing and turning the lock to rotate the bracket in the same direction by 90 degrees, which enables the belt to be removed.

A belt curve conveyor defined in claim 2 comprises guide wheels supported by brackets wherein the guide wheels can follow the movement of a belt by inclining toward a belt forward direction approximately 5 degrees together with the brackets that are fixed at an operating position in such a manner to have a clearance with engaging means arranged coaxially the rotary axis of the bracket and engaged with a groove so as to be pressed and rotated by a key part of the lock handle.

A belt curve conveyor defined in claim 3 comprises a holder member formed with extruded shapes of light metal. A belt curve conveyor defined in claim 4 comprises an end pulley in which a swaging processed taper roller is used. A belt curve conveyor defined in claim 5 comprises a wheel or a roller operable to hold a return belt under a driving side end pulley.

In a conventional belt curve conveyor, guide wheels are arranged at an outer surface edge of a belt in such a manner to be supported with a plate spring, which allows an inner holder to incline subtly in compliance with a belt's draw or bias towards inside so that the belt displaces slightly. As a result, a sharp tension to a belt which may cause the running off of the belt can be prevented. However, there exists slack at the back side of an advancing return belt. Therefore, if the advancing direction of a belt changes from the normal rotation to the reverse rotation under this situation, a belt will come off from guide wheels that are supported by plate springs. In other words, when a loose belt due to slack is pulled abruptly to the reverse direction, such slack of a belt develops vertical bound at guide wheels. Further, because of delayed following or torsion of a plate spring gap between guide wheels become bigger than a vertical size of a belt profile, which may cause a belt to come off from a holder. Then, in this invention, instead of using no plate spring, a spacer rubber or a rubber bush is engaged in an inner race of guide wheels in the shape of a rolling bearing to penetrate a supporting bolt. As a result, even if the direction of a belt is switched from forward to reverse, or from reverse to forward, the belt is prevented from coming off (deviation). Furthermore, a hollow sleeve is fixed coaxially to the rotation axis of a wheel supporting bracket wherein a lock is inserted into the sleeve through a spring in such a manner to move freely backward and forward axially, said lock has an engaging means arranged to be engaged with grooves of the sleeve in the rotation direction of the axis such that the engaging means can move backward and forward along with grooves formed in the shape of a cross and arranged at the outer surface of the lock for accommodating a key. With this structure, there is provided a clearance between the grooves of the lock having the engaging means that is pressed and turned by a key and the engaging means such that even though a bracket is fixed at the operating position, it inclines in the belt advancing direction by approximately 5 degrees with the bracket. As a result, guide wheels supported by a bracket can follow the movement of a belt so that even if the direction of a belt is switched from forward to reverse, or from reverse to forward, the belt is prevented from coming off (deviation).

In addition, conventionally, in a large taper end pulley, a taper pulley of predetermined length is prepared by butt welding a small and a large bulging taper sleeve, which is pricy. Accordingly, the taper accuracy is inferior since bulging materials are butt welded, which causes noise during belt traveling. Then, an end pulley used in this invention is prepared by a swaging method in which radial reciprocating is applied to a plural pairs of dies opposed to each other, in which tubes and bars are compressed from the periphery so as to be squeezed axially. The accuracy is well maintained with such an end pulley even when a wide belt is used. In addition, low vibration and low noise are maintained while operating. The manufacturing cost is less expensive compared with a bulging product. Furthermore, a wheel or a roller is provided under a drive end roller so as to suppress a return belt from below such that a driving force of a drive pulley is transmitted to a belt without loss even if a driving direction is shifted from forward to backward or vice verse.

MODES TO CARRY THE INVENTION

According to the present invention, the first guide roller abutting a top surface of a carrier belt, and the fourth guide roller abutting a bottom surface of a return belt are arranged as a pair to be supported by a holder member, while the second guide roller abutting the bottom surface of a carrier belt, and the third guide roller abutting the top surface of a return belt are arranged as a pair to be supported by upper and lower edges of a bracket fixed to the inner center of the holder member in a rotatable manner wherein a spacer rubber or a rubber bush is mounted to an inner race of a rolling bearing in each guide wheel in such a manner to penetrate a supporting bolt into the spacer rubber or the rubber bush so as to be fixed to the upper and lower edges of the holder member or the bracket. When a belt is replaced, this pair of guide rollers (the second and third guide rollers) is rotated by 90 degrees so that they are separated from the thickest part of the belt end, which allows the belt to be replaced.

Conventionally, breakage and stripping of a belt profile (circumferential part, peripheral part) are the primary causes of trouble in a belt curve conveyor. In this invention, a guide wheel used as a presser of a belt profile part is supported by upper and lower edges of a bracket engaged with the inner center of a holder member in a rotatable manner. A spacer rubber or a rubber bush is engaged in an inner race of a rolling bearing of each guide wheel in such a manner to penetrate a supporting bolt into the spacer rubber or the rubber bush to be fixed to the upper and lower edges of the holder member or the bracket so that such a belt profile part is supported with a predetermined pressing force, which prevents a belt from wearing. Furthermore, a projection is provided in the vicinity of the belt profile part while a skirt is provided at the frame side in proximity to the projection so that a tag (docket) can be prevented from being caught, which allows normal operation to be maintained.

In general, when a belt is replaced, all guide wheels, chain, motor, and inner frame must be removed. In a large belt curve conveyor, for instance, it takes approximately two hours if three people work together to loosen, remove, and refasten bolts. Thus, maintenance is inefficient. In addition, when assembling, adjusting the contact between a guide wheel and the belt profile to be equal depends on a person's experience. If there is only one spot where a guide wheel contacts excessively, it will cause breakage of a belt profile or a strip, which results in decreased reliability and poor assembly.

On the other hand, in this invention, a removable lock handle is inserted into a lock built in an axis part of a guide holder to rotate a holder, for example, 90 degrees in the right direction, pulled out, sequentially inserted into an adjacent lock of a guide holder to turn a holder 90 degrees in the same direction, and pull out. This procedure is repeated until all holders are rotated to release the belt pressure so that the time for replacing a belt can be vastly shortened. That is, the aforementioned release mechanism of the guide wheel makes it possible to release the belt easily while maintaining a big clearance, so that it takes approximately 30 minutes to replace a belt by combining a belt release function which is performed by a take-up mechanism of a cephalo caudal roller such as a drive roller; thus the maintainability is improved. When rotating a guide holder 90 degrees, instead of loosening a screw member to rotate and refastening, a removable lock handle is inserted into a lock to rotate, which results in an easy operation. Furthermore, when a belt is restored after removing it to clean, the removable lock handle is inserted and rotated in the opposite direction so as to reproduce the original setting, which improves the assembly efficiency. In addition, to employ a hollow shaft motor which is a chainless type motor as actuator of an end pulley, low noise operation can be achieved.

According to the present invention, the first guide roller abutting the top surface of a carrier belt, and the fourth guide roller abutting the bottom surface of a return belt are arranged as a pair to be supported by the upper and lower edges of a holder member fixed to the periphery of a base wherein a rubber is engaged in an inner race of a rolling bearing of each guide wheels in such a manner to penetrate a supporting bolt through the rubber to be fixed. The second guide roller abutting the bottom surface of a carrier belt, and the third guide roller abutting the top surface of a return belt are arranged as a pair to be supported by the upper and lower edges of a bracket fixed to the inner center of a holder member in a rotatable manner wherein a rubber is engaged in an inner race of a rolling bearing of each guide wheels in such a manner to penetrate a supporting bolt through the rubber to be fixed so as to be provided between the carrier side belt and the return side belt in a rotatable manner. When a belt is replaced, this pair of guide rollers (the second and third guide rollers) is rotated by 90 degrees so that they are separated from the thickest part of the belt end, which allows the belt to be replaced.

DETAILED DESCRIPTION OF THE PREFERRED EMBODIMENTS

Figure 1:
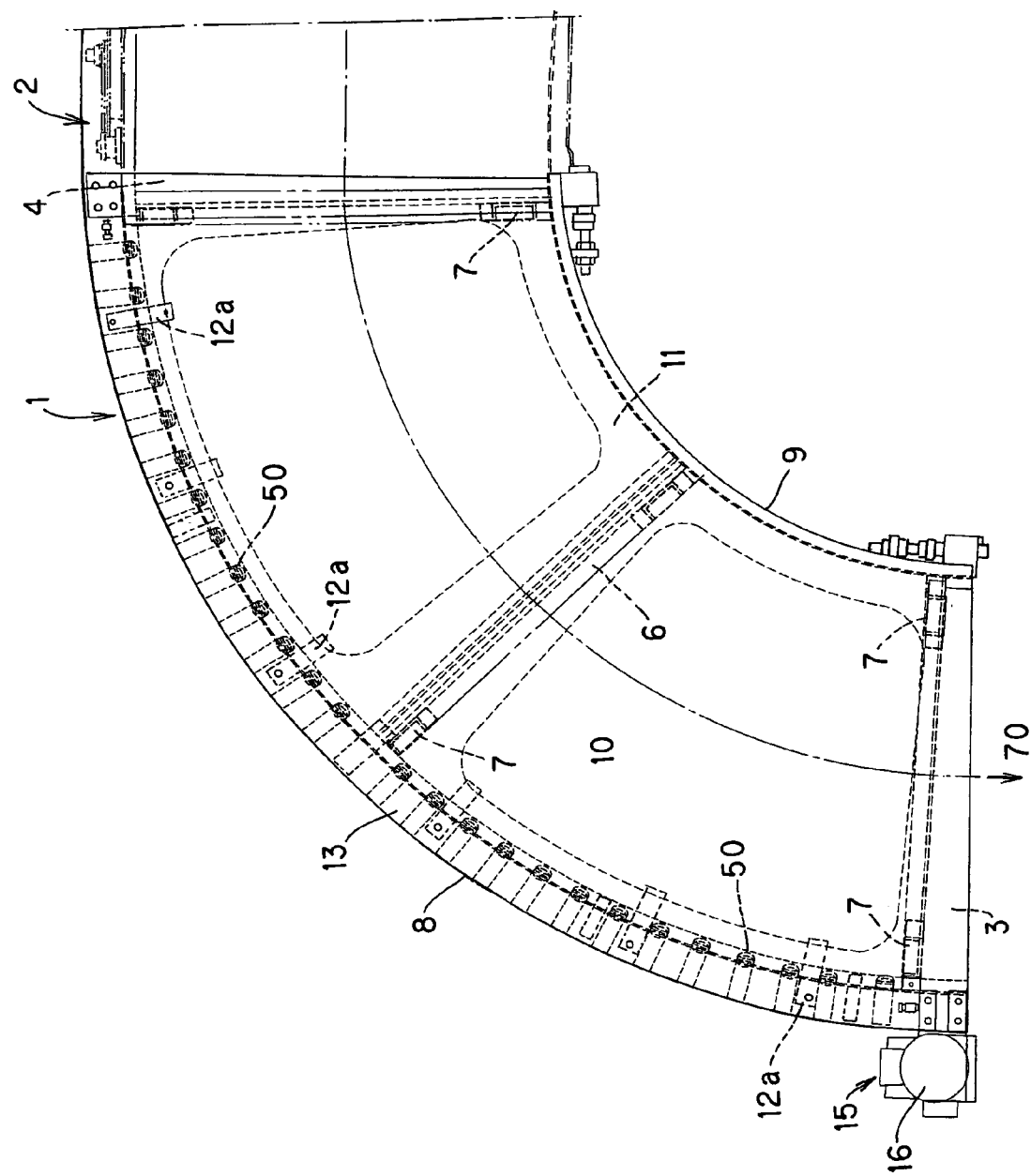
FIG. 1 is a plane view of a belt curve conveyor of the present invention.
Figure 2:
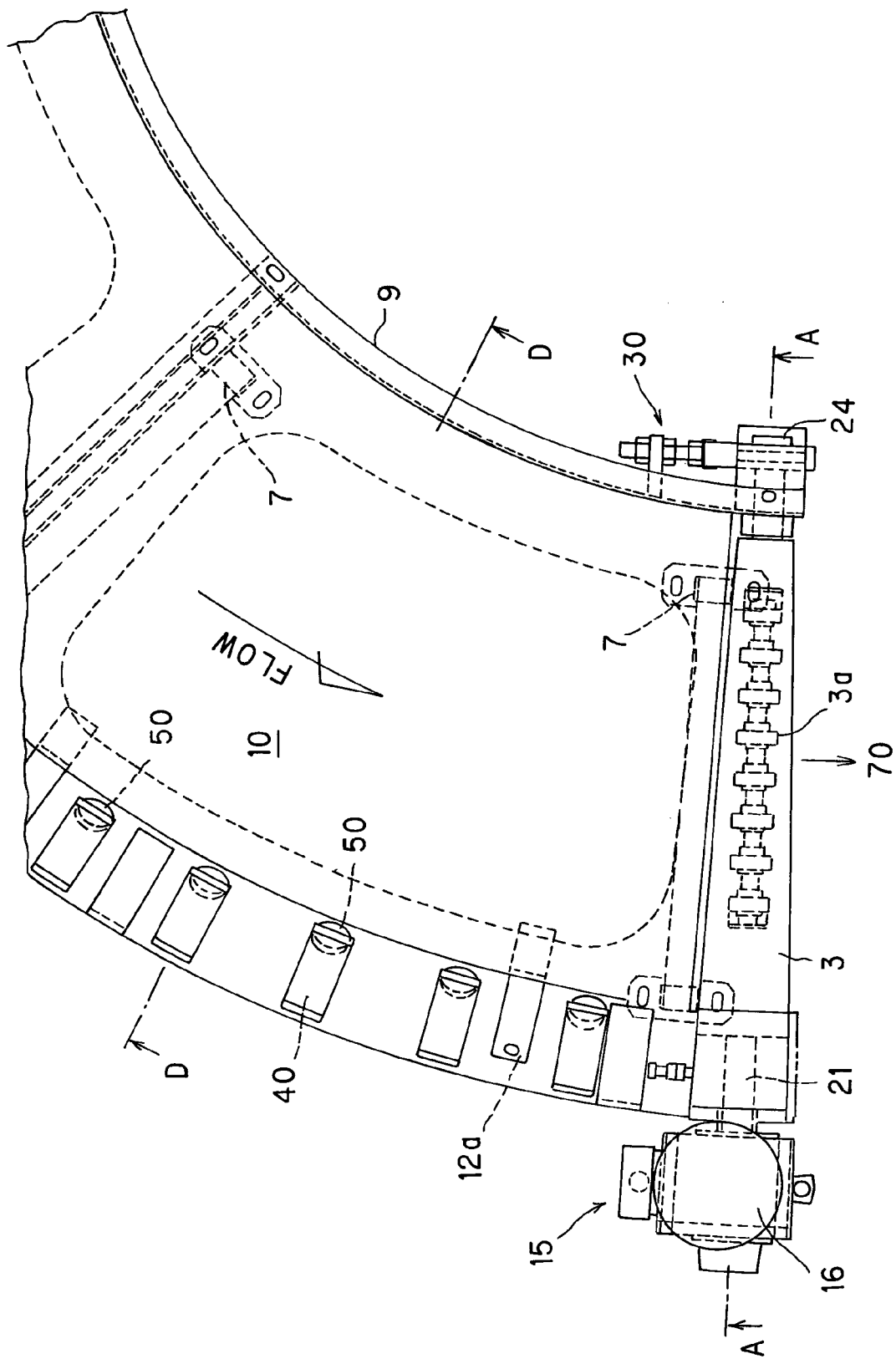
FIG. 2 is a partially enlarged plane view of FIG. 1.

Hereinafter, the preferred embodiments of the invention are explained referring to drawings. FIG. 1 is a plane view of a belt curve conveyor of the present invention, FIG. 2 is a partially enlarged plane view of FIG. 1., FIG. 3 is an enlarged sectional view along the A—A line of FIG. 2., and FIG. 4 is a plane view in the arrow direction from the B—B line of FIG. 3, respectively.

A curve belt conveyor 1 comprising a fan-type belt 10 stretched over between end pulleys 3, 4 at both ends, and a number of guide wheel units 50 arranged on the outer periphery of the belt for supporting a thickness end part 38 (FIG. 6), whose section is semicircular, formed at both surfaces in proximate to the outer periphery of the curve belt so as to prevent the curve belt from moving to a fan shape internal diameter so that the curve belt conveyor travels in such a manner to provide tension against the outside of the belt. The main part of the conveyor is supported by cross members 5, 5 adjacent to the end pulleys 3, 4, made by swaging processed and a leg unit 7 provided at a cross angle δ of the plane center of the fan-shape part wherein side plates 8, 9 are provided at the fan-shape part outside diameter part and inside diameter part of the curve belt at a base 11. A torque arm 18 is fixed to the end of a cross member 5 mounted on the large diameter axis end of the driving side end pulley 3 using a bolt 19 wherein a drive unit 15 comprising a motor (hollow shaft motor) 16 and a reduction gear 17 is mounted on this torque arm 18. As described above, because end pulleys made by swaging process are used, high accuracy, low vibration, low noise, and low cost is achieved when a wide belt is used. In addition, a roller 3a is provided below a drive pulley 3 so as to absorb sag of the belt back surface.

In the drawings, reference numeral 12 denotes a base plate for supporting a forwarding belt back surface (FIGS. 1, 6), numeral 12a is a support, numeral 13 is an outer cover, numeral 13a is a skirt, numeral 14 is a guide rail, numeral 21 is a pulley shaft, numeral 22 is a pulley bracket of a small diameter side (FIG. 5), numeral 22a is a pulley bracket of a large diameter side, numerals 23, 24 are bearing members, numerals 25, 26 are spherical bearings, and numeral 27 is an end cap. In FIG. 4, reference numeral 22b denotes an adjusting thread, and numeral 22c is an adjusting plate.

Figure 3:
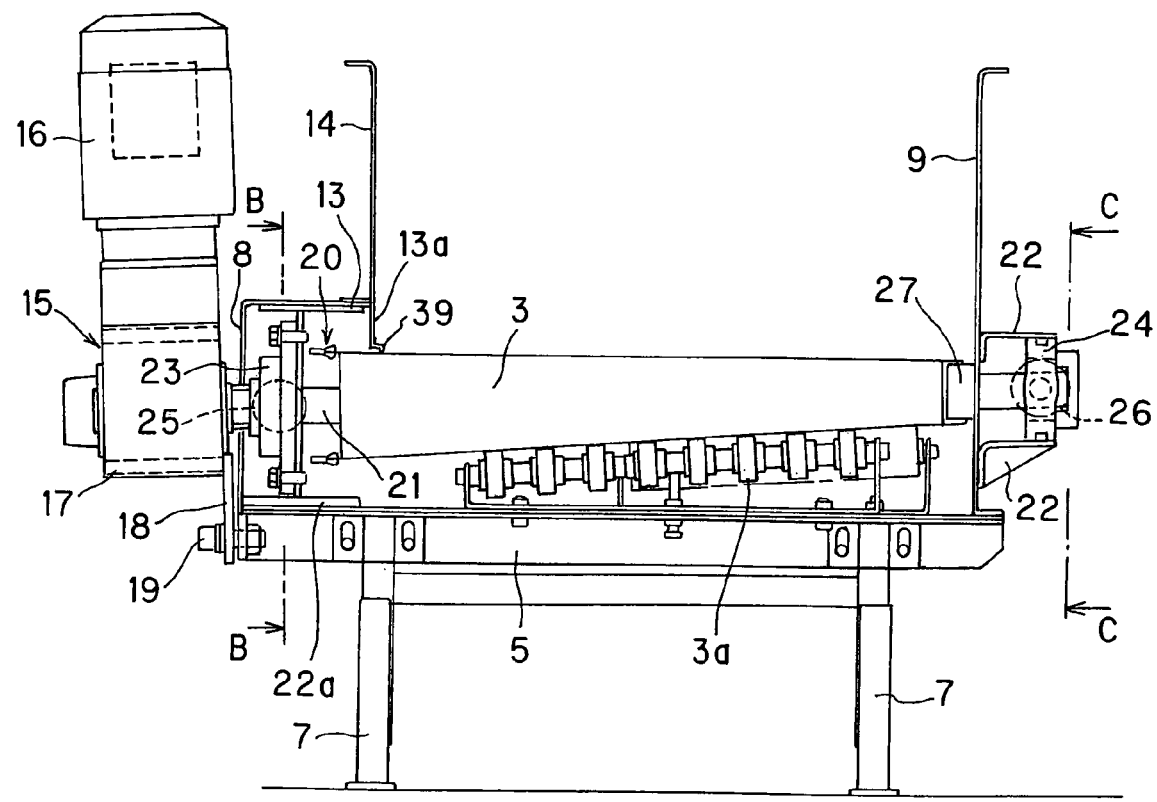
FIG. 3 is an enlarged sectional view along the A—A line of FIG. 2.
Figure 4:
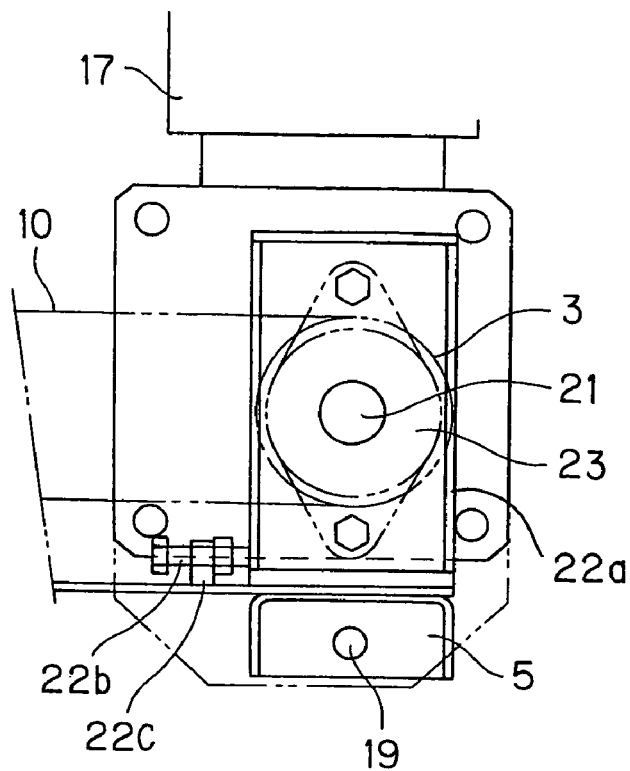
FIG. 4 is a plane view viewing in the arrow direction from the B—B line of FIG. 3.
Figure 6:
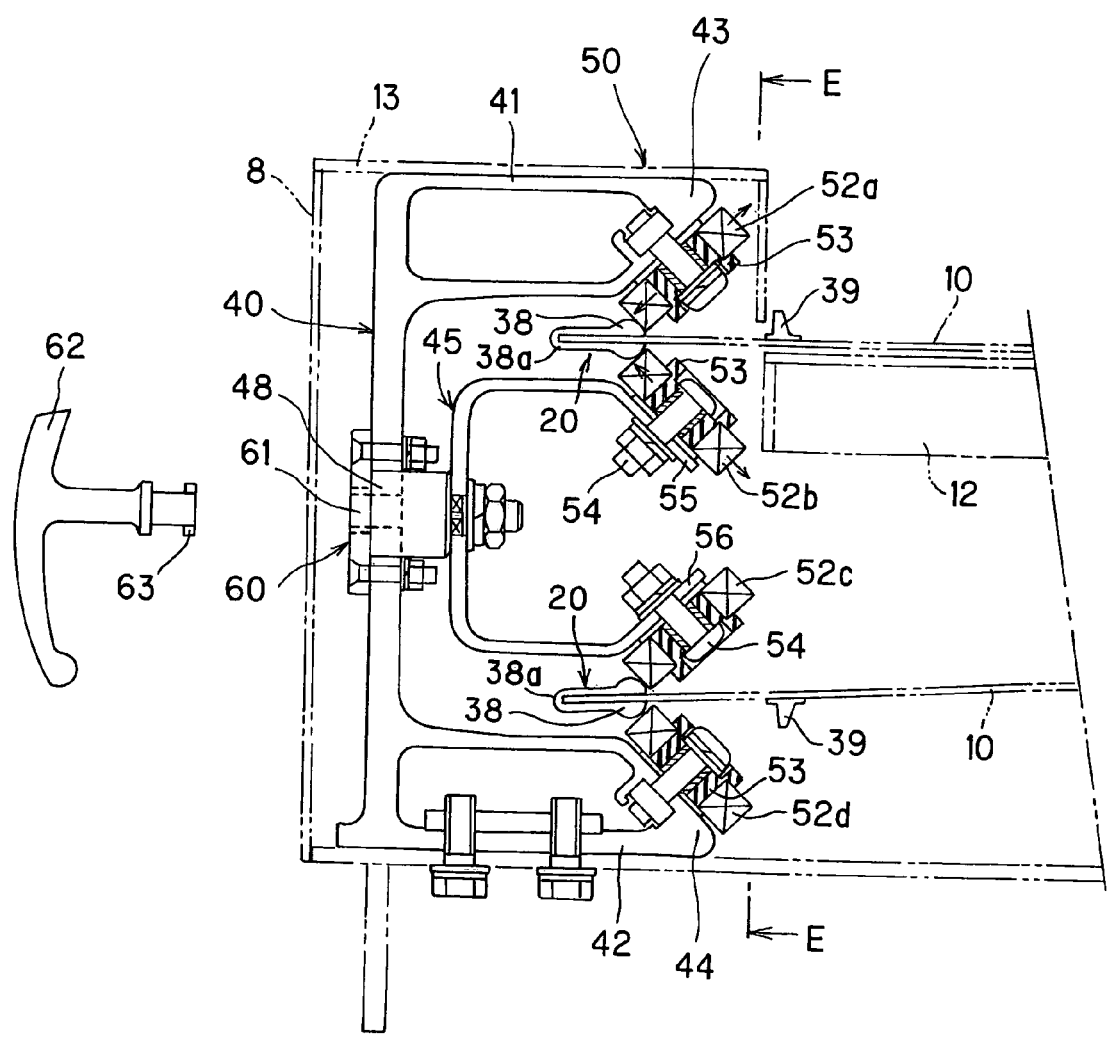
FIG. 6 is a further enlarged sectional view along the D—D line of FIG. 2.

As shown in FIGS. 3 and 6, a semicircular edge 38, 38 is formed on the top and bottom face of the peripheral part (belt profile 20) of the belt 10 in such a manner to abut a guide wheel of a guide wheel unit 50. This edge 38, 38 is formed on the end of a continuous side 38a (FIG. 6) surrounding the belt edge.

Protrusion of a belt is normally provided at a position separated a certain distance from the periphery of the belt and formed in a section of rectangular or trapezoidal shape. However, if it meanders, the raised corner of the protrusion of the section of rectangular or trapezoidal shape pinched by the guide wheels is torn off. In the present invention, the edge has a round shape to prevent jamming and being torn. As there is a clearance of 3–5 mm between the belt and the outer cover (a skirt 13a of the outer cover), to prevent involution stoppage and breakage resulting from a tag caught in this clearance, a protrusion 39 (FIG. 6) is provided on the top surface of the belt at the position separated a certain distance from the edge 38 to fill the clearance, which functions as a means of preventing tag (docket) jamming.

Each of the guide wheel unit 50 is composed of a first guide wheel and a fourth guide wheel 52a, 52d abutting the outer surface edge of a carrier belt and a return belt 10, and of a second guide wheel and a third guide wheel 52b, 52c abutting the inner surface face of a carrier belt and return belt (FIG. 6). Each of the first guide wheel and fourth guide wheel 52a, 52d is supported by upper and lower edges of a holder member 40 made of extruded section secured to an outer peripheral part of the base. Each of the second guide wheel and third guide wheel 52b, 52c is supported by a bracket 45 of common steel plate (for instance, SS41) bent in the shape of deformed C. That is, each guide wheel has a shape that is similar to that of a rolling bearing in which a spacer rubber or rubber bush 53 is engaged in its inner race in such a manner to penetrate a supporting bolt into the spacer rubber or the rubber bush 53 to be fixed to inclined surfaces 43, 44 formed opposite to the upper and lower edges of the holder member 40 and inclined edges 55, 56 extending from the upper and lower edges of the bracket 45 facing to each other, respectively.

Each of wheels 52a, 52d, and 52b, 52c are supported by bolt 54 standing up on the inclined surfaces 43, 44 provided at the upper and lower edges of the holder member 40 and the inclined edges 55, 56 extending from the upper and lower edges of the bracket 45, respectively; and in the meantime, mounted on in such a manner to be inclined at 45 degrees against the belt surface so as to press profile 38, 38 of both belt surfaces with the wheel periphery opposed to each other. In other words, because of spring of a spacer rubber or rubber bush 53 engaged in the outer periphery of a supporting bolt 54, the periphery of each wheel is constantly biased in the radial direction, that is, in the direction shown by an arrow in FIG. 6, such that the profile (circumferential part) 38, 38 is pressed to maintain the tension in the outer peripheral direction of a fan-shape belt. In addition, because the wheels press the profile with flat periphery and an edge of the wheel periphery does not hang over a belt, there is no fear of damaging a belt.

Figure 7:
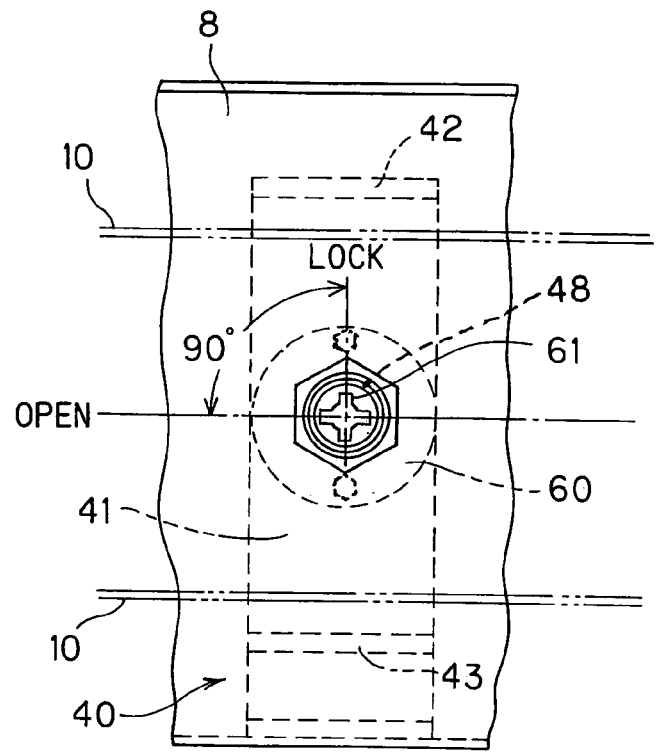
FIG. 7 is a side view of FIG. 6.

As shown in FIG. 6, a lock for inserting a key part 63 of a removable lock handle 62 is integrated in a case accommodating a rotation axis 48 of a wheel supporting bracket 45 at the center of the aforementioned holder 40. For instance, a hollow sleeve is fixed into the case 48 wherein a spring is engaged in the sleeve in such a manner to move freely back and forth in the axial direction while an engaging means or rotor guide (not shown) in the shape of being engaged with a groove of the sleeve is provided in the rotation direction of an axis. A cross-shaped furrow to be engaged with a key in a removable manner is provided at the outer surface of the lock (FIG. 7) such that after inserting a key, an engaging means can move back and forth along the groove of the sleeve. Because of the clearance between an engaging means pressed by a key part 63 of a lock handle 62 inserted in this lock (not shown) and the furrow of the lock, even when a bracket 45 is fixed to the rotation position, the guide wheels supported by a belt can follow belt movement by inclining approximately 5 degrees in the belt forward direction together with the bracket.

Figure 8:
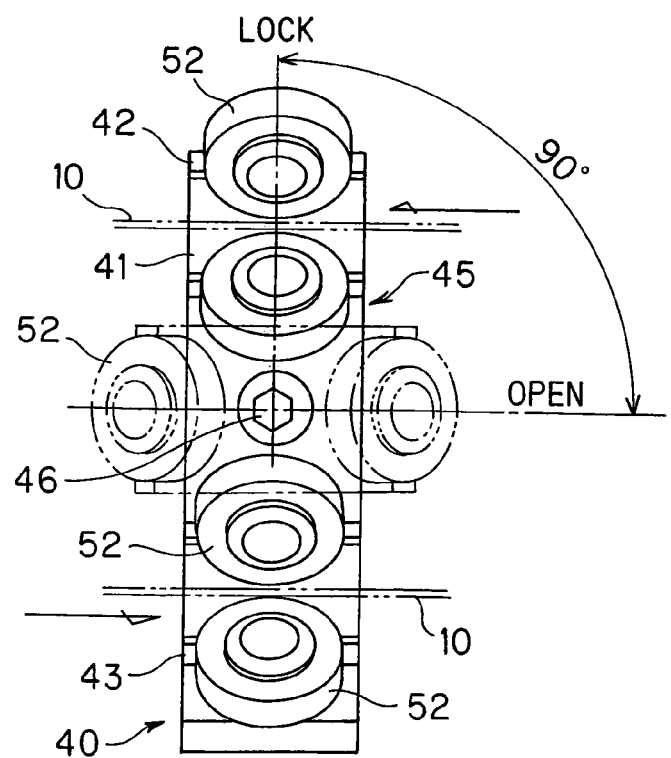
FIG. 8 is a plane view viewing in the arrow direction from the E—E line of FIG. 6.

When replacing a belt, as previously explained, a key part 63 provided at the tip of a removable lock handle 62 is inserted in a keyhole 61 provided at the outer end surface of the case 48 (FIG. 6), and rotated by 90 degrees (FIG. 7), which enables a belt to be replaced in such a manner to separate the second and third guide wheels 52b, 52c from the inner surface of the belt as shown by the chain line in FIG. 8.

Figure 5:
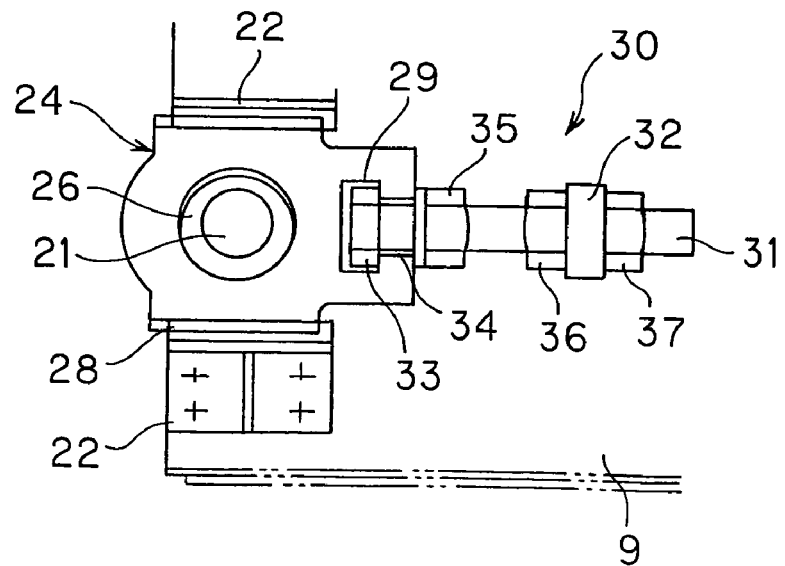
FIG. 5 is a plane view viewing in the arrow direction from the C—C line of FIG. 3.

FIG. 5 is a plane view in the arrow direction from the C—C line of FIG. 3. A small diameter side pulley bracket 22 of an end pulley is secured into a side plate 9 by a bolt in such a manner to support a bearing member 24 through a slide 28. A square hole 29 is provided at one of a bearing member 24 so as to be engaged with the head 33 of the screw bar 31 of a take up unit 30. The square hole 29 includes a notch 34 having a front opening. The screw bar 31 is inserted into a bracket 32 provided on a side plate 9 so as to be engaged with a nut 35 of the notch 34 side, the nuts 36, 37 abutting both surfaces of the bracket 32 so that the bearing member 24 can obtain the most appropriate belt tension.

As disclosed in Japanese patent unexamined publication H9-67960 and H9-100657, a detachable lock handle device comprises a lock part having a case providing a keyhole at front, a passive protrusion provided at the front circumferential part, a rotor having a salient locking axis on a rear face, a cover plate provided at the rear part of the rotor, a rotor guide, a bearing ring provided in the case, a spring for the cover plate, and a lock handle having a key in the diameter direction of the handle tip, which is an operational part. A detachable lock handle used in the invention comprises a crucial keyhole having four notches in the periphery of a hole 61 90 degrees apart (FIG. 7), and four projections at the tip of the lock handle 62 corresponding to the notches so that the 90 degree rotation of the handle is secured. As shown in FIG. 8, in order to separate the second guide wheel and the third guide wheel 52b, 52c from the inner surface of the belt, a bracket 45 is rotated 90 degrees by the lock handle operation. Then, the fitting bolt of the small diameter pulley bracket 22 of the aforementioned end pulley is loosened to slide the bearing member 24 outward, which allows the belt to be removed.

As explained above, in a belt curve conveyor of the invention, a first guide roller abutting a top surface of a carrier belt, and a fourth guide roller abutting a bottom surface of a return belt are arranged as a pair for suppressing a belt profile and supported by upper and lower edges of a holder member fixed to an outer periphery of a base wherein a rubber is engaged in an inner race of a rolling bearing of each guide wheels in such a manner to penetrate a supporting bolt into the rubber to be fixed. In the meantime a second guide roller abutting the bottom surface of a carrier belt, and a third guide roller abutting the top surface of a return belt are arranged as a pair to be supported by upper and lower edges of a bracket fixed to the inner center of the holder member in a rotatable manner wherein a rubber is inserted in an inner race of a rolling bearing of each guide wheels in such a manner to penetrate a supporting bolt in to the rubber so that a belt is supported by a predetermined pressing force, which prevents the belt from being damaged. Furthermore, a one-touch belt replacement mechanism in which pressing of a belt profile by guide wheels is released by an operation of a removable lock handle can vastly shorten the time for replacing a belt, which improves the maintainability and efficiency of the assembly.

What is claimed is:

1. A belt curve conveyor comprising a number of guide wheel units provided in proximity to the peripheral part of a fan-type belt slung over between tapered end pulleys of a drive side and a driven side, wherein an approximately semicircular profile is formed on both front and rear surfaces of the peripheral part of the belt in such a manner to abut on the guide wheels, said guide wheel units comprise a first guide wheel and a fourth guide wheel abutting the outside face edge of a carrier belt and a return belt, and a second guide wheel and a third guide wheel abutting the inside face edge of a carrier belt and a return belt;

said first guide wheel and fourth guide wheel are supported by upper and lower horizontal edges of a holder member secured to an outer peripheral part of a base while said second guide wheel and third guide wheel are supported by upper and lower edges of a rotation axis bracket rotatably secured to the inner center of the holder member wherein a spacer rubber or a rubber bush for biasing each wheel in the radial direction, that is, the lateral direction, is engaged into an inner race of a rolling bearing in each guide wheel in such a manner to penetrate a supporting bolt into the spacer rubber or the rubber bush to be fixed to the upper and lower edges of the holder member or the bracket; and a rotary lock part provided at the inner center of the holder member around a same axis of the rotation axis of the bracket while a keyhole formed at the outer surface thereof so as to be engaged with a key part arranged at the end of a detachable lock handle so that the second guide wheel and the third guide wheel become separated from the inner surface of the belt by means of inserting the key part of the lock handle in the lock part, pressing and turning the lock to rotate the bracket in the same direction by 90 degrees, which enables the belt to be removed.

2. A belt curve conveyor according to claim 1 comprising guide wheels supported by brackets wherein the guide wheels can follow the movement the movement of a belt by inclining toward a belt forward direction approximately 5 degrees together with the brackets that are fixed at an operating position in such a manner to have a clearance with engaging means arranged coaxially the rotary axis of the bracket and to be engaged with a groove so as to be pressed and rotated by a key part of the lock handle.

3. A belt curve conveyor according to claim 1 comprising the holder member formed with extruded shapes of light metal.

4. A belt curve conveyor according to claim 1 comprising at least one end pulley in a swaging processed taper roller.

5. A belt curve conveyor according to claim 1 comprising a wheel or a roller operable to hold a return belt under a driving side end pulley.

* * * * *